United States Patent
Lim

(10) Patent No.: US 11,308,050 B2
(45) Date of Patent: Apr. 19, 2022

(54) CONVERSION MECHANISM FOR COMPLEX COHABITATION DATABASES

(71) Applicant: BANK OF AMERICA CORPORATION, Charlotte, NC (US)

(72) Inventor: Joel Banaag Lim, Singapore (PH)

(73) Assignee: BANK OF AMERICA CORPORATION, Charlotte, NC (US)

( * ) Notice: Subject to any disclaimer, the term of this patent is extended or adjusted under 35 U.S.C. 154(b) by 301 days.

(21) Appl. No.: 16/685,562

(22) Filed: Nov. 15, 2019

(65) Prior Publication Data

US 2021/0149855 A1 May 20, 2021

(51) Int. Cl.
*G06F 16/00* (2019.01)
*G06F 16/21* (2019.01)
(Continued)

(52) U.S. Cl.
CPC ........ *G06F 16/217* (2019.01); *G06F 11/1446* (2013.01); *G06F 11/1448* (2013.01);
(Continued)

(58) Field of Classification Search
CPC ............... G06F 16/284; G06F 16/217; G06F 16/218–219; G06F 16/188; G06F 16/23;
(Continued)

(56) References Cited

U.S. PATENT DOCUMENTS 6,976,062 B1 12/2005 Denby et al.
7,191,435 B2 3/2007 Lau et al.
(Continued)

FOREIGN PATENT DOCUMENTS

EP 3264330 A1 * 1/2018
WO WO2002048878 A3 * 6/2002
(Continued)

OTHER PUBLICATIONS

K. Palanivel et al., "Publisher-subscriber: An agent system for notification of versions in OODBs", 2009 International Conference on Intelligent Agent& Multi-Agent Systems, 2009, pp. 1-6.*

*Primary Examiner* — Srirama Channavajjala
(74) *Attorney, Agent, or Firm* — Moore & Van Allen PLLC; Nicholas C. Russell

(57) ABSTRACT

Embodiments of the invention are directed to systems, methods, and computer program products for streamlining the processes involved with the cohabitation of relational database management system component versions. The system is further configured to automate the performance of edition downgrades of relational database management system services as well as automate edition downgrades for relational database management system server reporting services, server integration services, and server analysis services. Furthermore, the system is configured to launch command line interface on a user device, connect to target relational database components, retrieve necessary information, and automatically detect relational database management software versions. During the system processes, the system is designed to automatically performs pre-validation tasks and generate backup script files in chronological order.

14 Claims, 4 Drawing Sheets

(51) Int. Cl.
*G06F 11/14* (2006.01)
*G06F 16/28* (2019.01)
*H04L 29/06* (2006.01)
*G06F 16/23* (2019.01)

(52) U.S. Cl.
CPC ........ *G06F 11/1451* (2013.01); *G06F 16/235* (2019.01); *G06F 16/2329* (2019.01); *G06F 16/284* (2019.01); *H04L 63/083* (2013.01); *G06F 2201/80* (2013.01)

(58) Field of Classification Search
CPC ............. G06F 11/1446; G06F 11/1433; G06F 11/1438; G06F 11/1469; G06F 8/658; G06F 8/60; G06F 8/65; G06F 8/654; G06F 8/656; G06F 8/70–71; G06F 16/2329; G06F 16/235; G06F 11/1451; G06F 11/1464; G06F 11/1461; G06F 11/1458; G06F 11/1448; G06F 11/1487; H04L 63/083
See application file for complete search history.

(56) References Cited

U.S. PATENT DOCUMENTS

| | | | |
|---|---|---|---|
| 7,360,208 B2 | 4/2008 | Joshi et al. | |
| 7,603,669 B2 | 10/2009 | Curtis et al. | |
| 7,672,934 B1* | 3/2010 | Beatty | G06F 16/284 |
| | | | 707/999.003 |
| 8,055,743 B2 | 11/2011 | Frutiger et al. | |
| 8,209,564 B2 | 6/2012 | Vidal et al. | |
| 8,260,747 B2* | 9/2012 | Wu | G06F 11/1458 |
| | | | 707/649 |
| 8,417,737 B2 | 4/2013 | Hopmann et al. | |
| 8,806,471 B2 | 8/2014 | Vidal et al. | |
| 9,280,604 B2 | 3/2016 | Siddiqui et al. | |
| 9,354,976 B2* | 5/2016 | Amlekar | G06F 16/00 |
| 9,411,576 B2* | 8/2016 | Hocker | G06F 8/65 |
| 9,413,780 B1 | 8/2016 | Kaplan et al. | |
| 9,836,315 B1 | 12/2017 | Ramalingam et al. | |
| 9,892,003 B2* | 2/2018 | Gaschler | G06F 11/1461 |
| 9,900,377 B2 | 2/2018 | Borley et al. | |
| 10,055,339 B2 | 8/2018 | Bhojan | |
| 10,142,204 B2 | 11/2018 | Nickolov et al. | |
| 10,191,736 B2 | 1/2019 | Ari | |
| 10,289,401 B1 | 5/2019 | Gerraty | |
| 10,289,495 B1* | 5/2019 | Chakraborty | G06F 11/1464 |
| 10,496,532 B1 | 12/2019 | Kaitha | |
| 2004/0015940 A1 | 1/2004 | Heisey et al. | |
| 2004/0187103 A1* | 9/2004 | Wickham | G06F 8/65 |
| | | | 717/168 |
| 2005/0114853 A1* | 5/2005 | Glider | G06F 8/60 |
| | | | 717/170 |
| 2005/0246702 A1* | 11/2005 | Yeh | G06F 8/65 |
| | | | 717/170 |
| 2008/0049779 A1 | 2/2008 | Hopmann et al. | |
| 2008/0313186 A1* | 12/2008 | Marsh | G06F 16/93 |
| 2011/0107141 A1* | 5/2011 | Yeh | G11C 29/76 |
| | | | 714/6.12 |
| 2012/0079471 A1* | 3/2012 | Vidal | G06F 8/65 |
| | | | 717/169 |
| 2012/0089573 A1* | 4/2012 | Schmidt | G06F 11/1458 |
| | | | 707/661 |
| 2012/0117203 A1 | 5/2012 | Taylor et al. | |
| 2013/0067229 A1* | 3/2013 | German | H04L 63/0815 |
| | | | 713/171 |
| 2013/0138695 A1* | 5/2013 | Stanev | G06F 16/219 |
| | | | 707/792 |
| 2013/0339643 A1* | 12/2013 | Tekade | G06F 11/1451 |
| | | | 711/162 |
| 2014/0379660 A1* | 12/2014 | Vorsprach | G06F 3/0683 |
| | | | 707/654 |
| 2015/0088772 A1 | 3/2015 | Shwartz et al. | |
| 2015/0293817 A1* | 10/2015 | Subramanian | G06F 11/1448 |
| | | | 707/645 |
| 2015/0317148 A1* | 11/2015 | Ohashi | G06F 8/65 |
| | | | 717/170 |
| 2019/0317774 A1* | 10/2019 | Raghav | G06F 9/4406 |

FOREIGN PATENT DOCUMENTS

| | | | |
|---|---|---|---|
| WO | WO2003107181 | * | 12/2003 |
| WO | WO2004025517 A1 | * | 3/2004 |
| WO | WO2015127240 A1 | * | 8/2015 |
| WO | WO2015/167937 A1 | * | 11/2015 |
| WO | WO2016048416 A1 | * | 3/2016 |

* cited by examiner

Relational Database Setup Discovery Report

400

| Product | Instance | Instance ID | Feature | Edition | Version | Clustered | Configured |
|---|---|---|---|---|---|---|---|
| Product Name 1 | (Instance Name) | ID.InstanceName | Database Engine Service | Developer Edition | (Version #) | No | Yes |
| Product Name 2 | (Instance Name) | ID.InstanceName | Server Replication | Developer Edition | (Version #) | No | Yes |
| Product Name 3 | (Instance Name) | ID.InstanceName | Full Text and Semantic Extractions for Search | Developer Edition | (Version #) | No | Yes |
| Product Name 4 | (Instance Name) | ID.InstanceName | Data Quality Services | Developer Edition | (Version #) | No | Yes |
| Product Name 5 | (Instance Name) | ID.InstanceName | Management Tools - Basic | Developer Edition | (Version #) | No | Yes |
| Product Name 6 | (Instance Name) | ID.InstanceName | Management Tools - Complete | Developer Edition | (Version #) | No | Yes |
| Product Name 7 | (Instance Name) | ID.InstanceName | Client Tools Connectivity | Developer Edition | (Version #) | No | Yes |
| Product Name 8 | (Instance Name) | ID.InstanceName | Client Tools Software Developer Kit | Developer Edition | (Version #) | No | Yes |
| Product Name 9 | (Instance Name) | ID.InstanceName | Integration Services | Developer Edition | (Version #) | No | Yes |
| Product Name 10 | (Instance Name) | ID.InstanceName | Server Reporting Services | Developer Edition | (Version #) | No | Yes |
| Product Name 11 | (Instance Name) | ID.InstanceName | Server Analysis Services | Developer Edition | (Version #) | No | Yes |

*FIGURE 4*

CONVERSION MECHANISM FOR COMPLEX COHABITATION DATABASES

FIELD OF THE INVENTION

The present invention generally relates to a set of functions and procedures allowing automation for the downgrade of relational database management systems using an operating system, application, or other service across one or more entity systems.

BACKGROUND

Existing relational database management systems, especially in large scale, may be complex to manually downgrade as they may involve numerous different services, file systems, registry configurations, and server locations. In current systems, without knowledge of specific configuration values, a catastrophic downgrade failure may result during an attempted edition downgrade, which could lead to file corruption, erroneous output, and require intensive rollback operations to be performed in order to resolve these issues. Furthermore, performing a manual edition downgrade requires documentation for each typical and complex setup combination, and results in time consuming and tiresome work. The same information is also needed to successfully rollback the entire operation, which results in a time consuming process in the event of downgrade failure.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address these and/or other needs by providing a system for automating the downgrade process of a relational database management system, even on large scales. Embodiments of the invention are directed to systems, methods, and computer program products for streamlining the processes involved with the cohabitation of relational database management system component versions. The system is further configured to automate the performance of edition downgrades of relational database management system services as well as automate edition downgrades for relational database management system server reporting services, server integration services, and server analysis services. Furthermore, the system is configured to launch command line interface on a user device, connect to target relational database components, retrieve necessary information, and automatically detect relational database management software versions. During the system processes, the system is designed to automatically performs pre-validation tasks and generate backup script files in chronological order.

In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for automating a software version downgrade of a database management system, the computer implemented method comprising: receiving a request from a user via a user device to launch a downgrade tool; transmitting a request for authentication information from the user; receiving the authentication information from the user via the user device and authenticate the user to access the downgrade tool on the user device; generating a connection between the user device and a target device, wherein the target device hosts a database to be downgraded; generating a backup of the target device database and transmitting the backup to the user device; receiving information for the target device and the database and automatically detecting a database version and a server version; based on the detected database version and server version, generating multiple server scripts for downgrade of the target device database; executing the generated server scripts to downgrade the target device database; and generating a database discovery report.

In some embodiments, the user device is connected to the target device via a remote desktop portal.

In some embodiments, the multiple server scripts are stored on a desktop of the user device and the one or more server scripts are executed on the target device using a command line interface.

In some embodiments, the system is further configured to perform a pre-validation check prior to performing the backup of the target device database comprising: verifying a password for the user and determine if the user is authorized to perform the downgrade on the target device; verifying drive mappings on the target device to determine a valid storage configuration on the target device; and performing a test of a remote connection between the user device and the target device.

In some embodiments, the system is configured to transmit an option to the user device to generate a database discovery report for the target device without performing a database downgrade by using an ancillary downgrade tool.

In some embodiments, the database discovery report comprises a complete edition and version of all relational database server components and services installed on the target device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
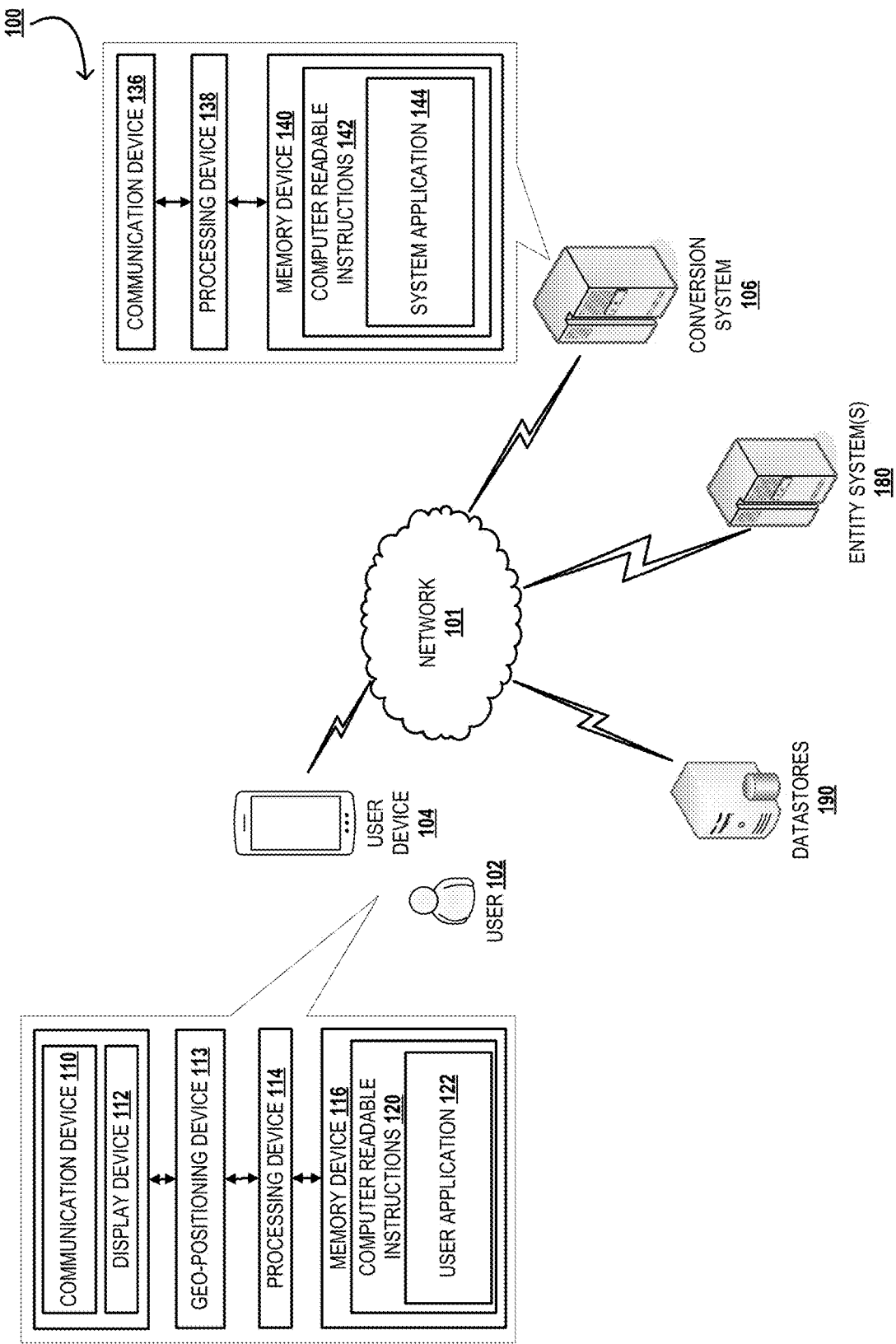
Figure 2:
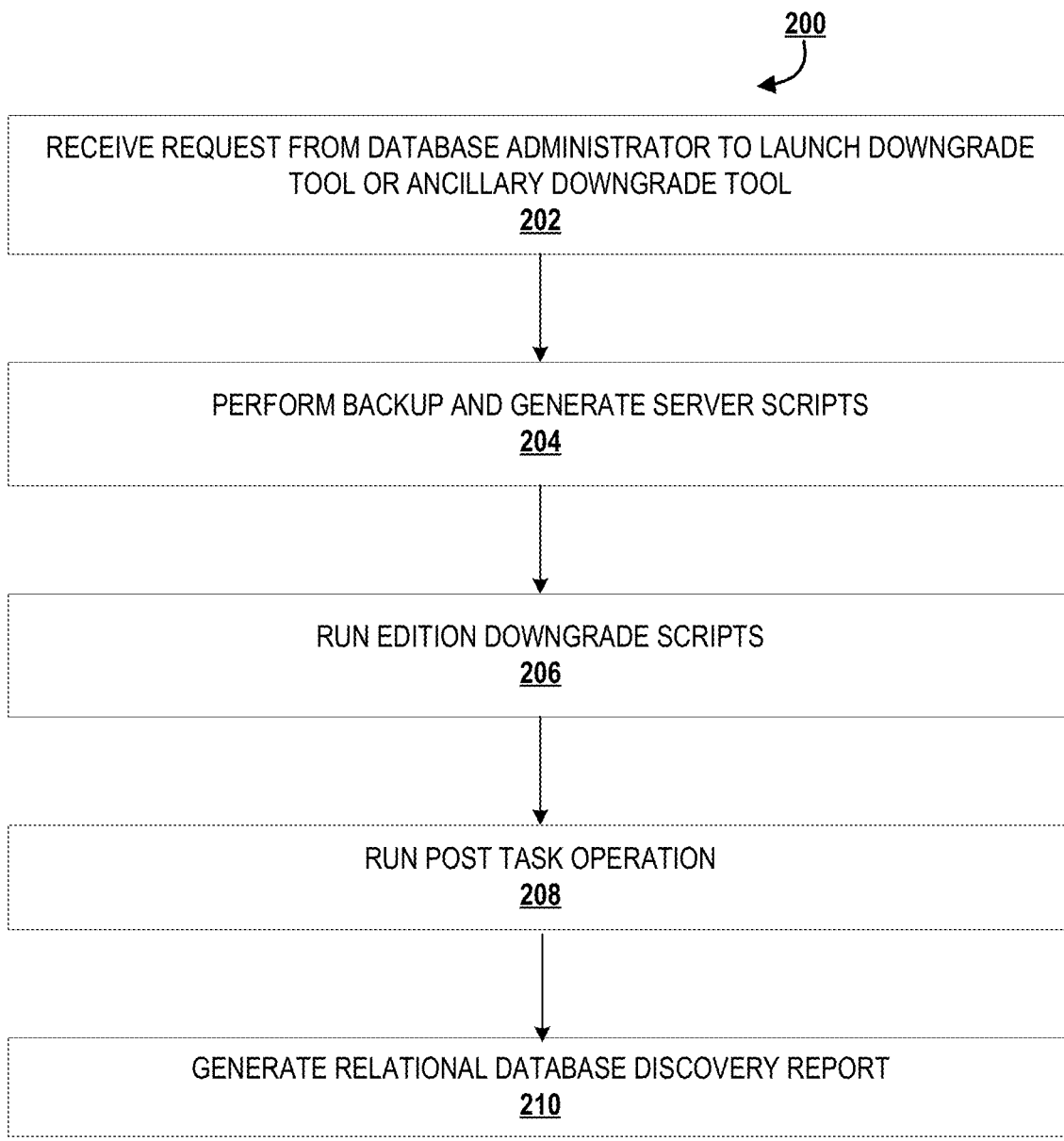
Figure 3:
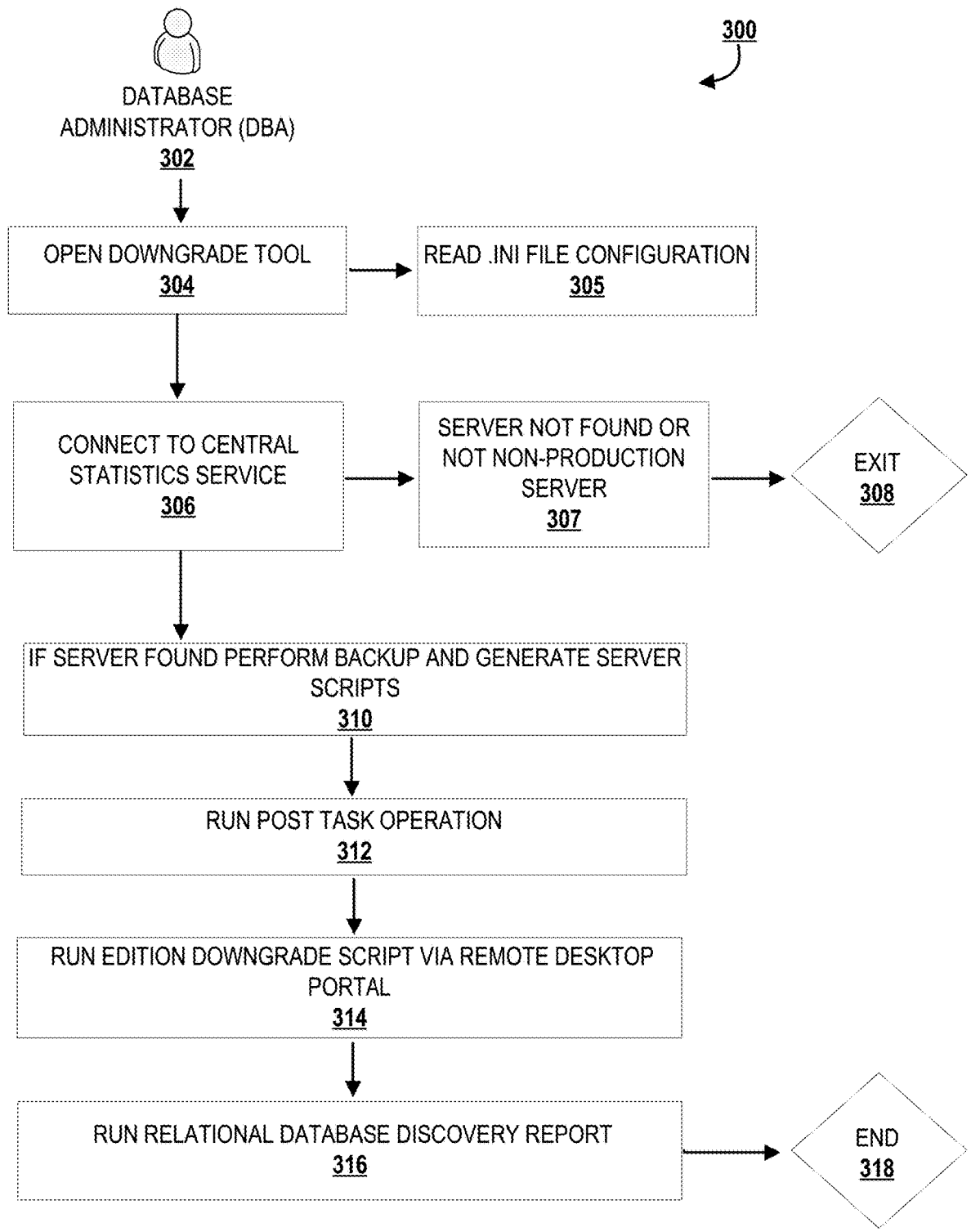

Having thus described embodiments of the invention in general terms, reference will now be made to the accompanying drawings, wherein:

FIG. 1 depicts a platform environment 100 providing a system for conversion of complex cohabitation databases, in accordance with one embodiment of the present invention;

FIG. 2 depicts a high level process flow diagram 200 for utilizing system tools, in accordance with one embodiment of the present invention;

FIG. 3 depicts a process flow diagram 300 for utilizing system tools, in accordance with one embodiment of the present invention; and FIG. 4 depicts a relational database discovery report 400, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein. In accordance with embodiments of the invention, the term "user" may refer to an authorized person, business or the like, who utilizes an external apparatus such as a user device, for accessing a convers. The external apparatus may be a user device (computing devices, mobile devices, smartphones, wearable devices, and the like). In some embodiments, the user may seek to perform one or more user activities using a web-based application accessed via the user device web browser or in some embodiments may perform one or more user activities using a locally stored application on the user device to interact with the system of the invention. In some embodiments, the user may perform a query by initiating a request for information from the entity systems or various databases using the user device to interface with the system to configure, test, or downgrade system database components.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution.

A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/ or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like. In some embodiments, the graphical user interface may be presented in a different configuration depending on the user or type of user that accesses it. In some embodiments, the graphical user interface may be a component of a web-based application that the user may access remotely over a network or a secure virtual private network, secure socket layer, and the like.

Embodiments of the invention are directed to systems, methods, and computer program products for streamlining the processes involved with the cohabitation of relational database management system component versions. The system is further configured to automate the performance of edition downgrades of relational database management system services as well as automate edition downgrades for relational database management system server reporting services, server integration services, and server analysis services. Furthermore, the system is configured to launch command line interface on a user device, connect to target relational database components, retrieve necessary information, and automatically detect relational database management software versions. During the system processes, the system is designed to automatically performs pre-validation tasks and generate backup script files in chronological order.

FIG. 1 depicts a platform environment 100 providing a system for conversion of complex cohabitation databases, in accordance with one embodiment of the present invention. As illustrated in FIG. 1, a conversion system 106 is configured for providing an application or web application interface accessible by a user 102 via user device 104. The conversion system 106 is operatively coupled, via a network 101 to one or more user devices 104, to entity systems 180, datastores 190, and other external systems/third-party servers not illustrated herein. In this way, the conversion system 106 can send information to and receive information from multiple user devices 104 to provide an integrated platform and data access to a user 102. At least a portion of the system is typically configured to reside on the user device 104 (for example, at the user application 122), on the conversion system 106 (for example, at the system application 144), and/or on other devices and systems such as the entity systems 180 and is a responsive system that facilitates execution of database configurations and version management.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the user 102 is an individual that wishes to conduct one or more activities with conversion system 106 using the user device 104. In some embodiments, the user 102 may access the conversion system 106, and/or the entity system 180 through a user interface comprising a webpage or a user application. Hereinafter, "user application" is used to refer to an application on the user device 104 of the user 102, a widget, a webpage accessed through a browser, and the like. As such, in some instances, the user device may have multiple user applications stored/installed on the user device 104 and the memory device 116 in particular. In some embodiments, the user application is a user application 122, also referred to as a "user application" 122 herein, provided by and stored on the user device 104 by the conversion system 106. In some embodiments the user application 122 may refer to a third party application or a user application stored on a cloud used to access the conversion system 106 through the network 101. In some embodiments, the user application is stored on the memory device 140 of the conversion system 106, and the user interface is presented on a display device of the user device 104, while in other embodiments, the user application is stored on the user device 104.

The user 102 may subsequently navigate through the interface, perform one or more searches for database information or initiate one or more activities or database downgrades, inventories, or configurations using a central user interface provided by the user application 122 of the user device 104. In some embodiments, the user 102 may be routed to a particular destination using the user device 104. In some embodiments the user device 104 requests and/or receives additional information from the conversion system 106 or the user device 104 for authenticating the user or the user device, determining appropriate queues, executing information queries, executing scripts, initiating downgrade functions, and other system functions.

The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 180, datastores 190, and the conversion system 106. As such, the communication device 110 generally comprises a modem, server, or other device for communicating with other devices on the network 101. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, system tools and functions, communicate with the conversion system 106 to request or transmit information, initiate a database version downgrade or rollback, and/or view analytics data using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the user application 122, when executed by the processing device 114 are configured to cause the user device 104 and/or processing device 114 to perform one or more steps described in this disclosure, or to cause other systems/devices to perform one or more steps described herein.

As further illustrated in FIG. 1, the conversion system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-todigital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity systems 180, datastores 190, and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the conversion system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices (such as the user device 104, the user application 122, and the like) to perform one or more steps described herein. In some embodiments, the memory device 140 includes a data storage for storing data related to user transactions and resource entity information, but not limited to data created and/or used by the system application 144. In the embodiment illustrated in FIG. 1, and described throughout much of this specification, a "system" configured for performing one or more steps described herein refers to the user application 122, that may perform one or more user activities either alone or in conjunction with the conversion system 106, and specifically, the system application 144, and the like.

FIG. 2 depicts a high level process flow diagram 200 for utilizing system tools, in accordance with one embodiment of the present invention. As depicted in FIG. 2, block 202, the process begins whereby the system receives a request from a database administrator to launch one or more tools. The database administrator is synonymous with the user 102 as discussed with regard to FIG. 1, and interacts with the conversion system 106 via the user device 104. In particular, the one or more tools that may be utilized by the database administrator consist of a relational database downgrade tool, or an ancillary downgrade tool which are each provided by the conversion system 106 in order for the database administrator to configure various relational databases of the entity systems 180 or datastores 190. In some embodiments the relational database downgrade tool is utilized by the database administrator in order to perform an edition downgrade (e.g. downgrade a relational database from "enterprise" or "standard" edition to "developer" edition). In further embodiments, the database administrator may utilize the ancillary downgrade tool in order to perform server analysis services, server reporting services, server integration services, or downgrade relational database components with duplicate or identical instance names for analysis, reporting, or integration services.

If pre-validation steps are completed successfully, the program performs a backup operation and generate a backup script file on the database administrator's device desktop and then generate multiple command line script files on a target database server machine, as shown in block 204. The database administrator may then run each script in chronological order to perform a downgrade, as shown in bock 206. In some embodiments, the database administrator may run a post task operation, as shown in block 208, such as in instances where a report server database exists, and the database administrator wishes to restore the databases of a report server and report server temporary database from a standard backup location. Finally, as shown in block 210, the database administrator may transmit instructions to the system to generate a relational database discovery report, as further discussed with regard to FIG. 4.

FIG. 3 depicts a process flow diagram 300 for utilizing system tools, in accordance with one embodiment of the present invention. In typical embodiments, a database administrator will launch a command line interface on the operating system of a user device connected to the conversion system 106 and entity system 180 to execute one or more system tools, as shown by the database administrator 302 in FIG. 3 who may perform the step of opening a downgrade tool, as depicted in block 304. In some embodiments, the database administrator 302 will enter required details for utilizing the one or more tools on an "ini" file, as shown in block 305. The ini file contains all parameters and information required for relational database downgrade, and the system 106 will use this file to connect to a target relational database component such as a central statistics service and will retrieve necessary information, and automatically detect database and server versions, as shown in block 306. The program performs a pre-validation of tasks such as checking authentication values for the database administrator, checking drive mappings, testing a remote connection to a target device containing the relational database, and checks for system administrator password authentication. If the server is not found the target database is not on a non-production server, as shown in block 307, the system 106 will exit the process, as shown in diamond 308.

If the server is found, the pre-validation step is considered to be completed successfully, and the system 106 performs a backup operation to generate a backup script file on the database administrator's 302 device desktop and then generate multiple command line script files on a target database server machine, as indicated in block 310. In some embodiments where a post-task operation is necessary, the system 106 may run the post task operation as shown in block 312. In some embodiments, the post-task operation involves performing a comprehensive restore operation and re-applying original settings of relational database components from a relational database server to level-up database operating system server registry settings such as: (1) server instance and database agent configurations; (2) server logins and permissions; (3) server dependencies (e.g. database mail, linked servers and server integration service packages); (3) database level settings, including database mirroring and always-on features; and (5) operating system server related settings such as registry and file systems used by database servers.

Next, as shown in block 314, the system runs the downgrade scripts in chronological order via the remote desktop portal on the database administrator 302 device desktop in order to perform the edition downgrade. In some embodiments, the system executes the script files which contain command-line interface commands such as "copy drive,"

"unmap drive," "map drive," "move file," "move folder" and the like in order to complete various tasks via the target device operating system. The system 106 supports all relational database server operating system versions maintained by the entity systems 180 (e.g. various server versions), and is able to perform a seamless and comprehensive edition downgrade of server components from beginning to end. Additionally, the system downgrade tool intelligently controls and manages the edition downgrade on a step-by-step basis. For instance, the downgrade tool will not allow for the downgrade directly of a relational database instance with lower version relational database components, but will instead guide the database administrator 302 to perform step-by-step time in place edition downgrade of server instance. The downgrade tool will also guide the database administrator 302 to perform side by side removal of relational database instance to remove dependencies property, which is vital on the edition downgrade, especially in complex configurations. At the same time as performing the edition downgrade, the downgrade tool inventories database version information by performing a scan of edition or version of database server installed on the target device, in order to later run a relational database discovery report, as shown in block 316. Once the discovery report is generated, the process ends, as shown in diamond 318.

FIG. 4 depicts a relational database discovery report 400, in accordance with one embodiment of the present invention. The downgrade tool program generates full proof of reporting for before and after the edition downgrade operation, and an exemplary sample report can be seen in FIG. 4. It is understood that the report may include further information as configured by the database administrator 302. The discovery report 400 includes the complete edition and version of relational database server components and services installed on the target device. The downgrade tool or ancillary downgrade tool may, in some embodiments, be solely used to retrieve the complete relational database server information of a target device without performing a downgrade. The system tools simplify the operation to call and generate such a report. The reporting process is compatible in all version of operating systems that an entity such as entity system 180 may use. When working on an edition downgrade, the user will typically be required to work on each of multiple servers and components, and would traditionally need to connect one by one to each relational database server or services and run manually a command to retrieve the edition information of database servers before and after edition downgrade. In some instances, and for some components, the user would be required to check these details using an operating system registry to retrieve these values. As such, the discovery report 400 is extremely helpful and useful to database administrator 302, as it eliminates all these conventional work requirements, and provides concrete information and guarantee to the database administrator 302 that no crucial details are incorrectly reported during the edition downgrade and provides a report to verify that the operation is completed successfully. Without the downgrade tool in place, the total amount of time to downgrade the edition of one server instance from beginning to end may traditionally take 10 hours. In contrast, using the downgrade tool, the expected time to complete the downgrade fully is typically reduced approximately tenfold, if not more, to at or around 1 hour, or less.

As shown in FIG. 4, the discovery report 400 includes a table of information that shows product, instance, instance identification (ID), feature, language, edition, version, and an indication for whether or not the product is clustered and whether or not the product is configured. Each product may correlate to a different feature, as indicated in discovery report 400. For instance, "Product Name 1" may be a database engine service, while "Product Name 2" may be a server replication feature, and the like. As shown, the computing language may also be identified, as well as the edition of the relational database server system, the version of the relational database server software, and a "yes" or "no" indication of whether or not each product is clustered or configured at the time the downgrade tool generates the discovery report 400.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for automating a software version downgrade of a database management system, the system comprising:
at least one memory device with computer-readable program code stored thereon;
at least one communication device;
at least one processing device operatively coupled to the at least one memory device and the at least one communication device, wherein executing the computer-readable program code is configured to cause the at least one processing device to:
receive a request from a user via a user device to launch a downgrade tool;
transmit a request for authentication information from the user;
perform a pre-validation check prior to performing a backup of a target device database comprising:
verifying a password for the user and determine if the user is authorized to perform the downgrade on the target device;
verifying drive mappings on the target device to determine a valid storage configuration on the target device; and
performing a test of a remote connection between the user device and the target device;
receive the authentication information from the user via the user device and authenticate the user to access the downgrade tool on the user device;
generate a connection between the user device and a target device, wherein the target device hosts a database to be downgraded;
generate the backup of the target device database and transmit the backup to the user device;
receive information for the target device and the database and automatically detect a database version and a server version;
based on the database version and server version detected, generate multiple server scripts for downgrade of the target device database;
execute the generated server scripts to downgrade the target device database;
execute a post-task operation, wherein the post-take operation comprises performing a restore operation and re-applying original settings of relational database components from a relational database server to update database operating system server registry settings; and
generate a database discovery report, wherein the database discovery report comprises a complete edition and version of all relational database server components and services installed on the target device.

2. The system of claim 1, wherein the user device is connected to the target device via a remote desktop portal.

3. The system of claim 1, wherein the multiple server scripts are stored on a desktop of the user device and the one or more server scripts are executed on the target device using a command line interface.

4. The system of claim 1, wherein the system is configured to transmit an option to the user device to generate an additional database discovery report for the target device without performing a database downgrade by using an ancillary downgrade tool.

5. The system of claim 1, wherein each of the multiple server scripts are executed one-by-one in a specific chronological order.

6. A computer program product for automating a software version downgrade of a database management system, the computer program product comprising a non-transitory computer-readable storage medium having computer-executable instructions to:
receive a request from a user via a user device to launch a downgrade tool;
transmit a request for authentication information from the user;
perform a pre-validation check prior to performing a backup of a target device database comprising:
verifying a password for the user and determine if the user is authorized to perform the downgrade on the target device;
verifying drive mappings on the target device to determine a valid storage configuration on the target device; and
performing a test of a remote connection between the user device and the target device;

receive the authentication information from the user via the user device and authenticate the user to access the downgrade tool on the user device;

generate a connection between the user device and a target device, wherein the target device hosts a database to be downgraded;

generate the backup of the target device database and transmit the backup to the user device;

receive information for the target device and the database and automatically detect a database version and a server version;

based on the database version and server version detected, generate multiple server scripts for downgrade of the target device database;

execute the generated server scripts to downgrade the target device database;

execute a post-task operation, wherein the post-take operation comprises performing a restore operation and re-applying original settings of relational database components from a relational database server to update database operating system server registry settings; and generate a database discovery report, wherein the database discovery report comprises a complete edition and version of all relational database server components and services installed on the target device.

7. The computer program product of claim 6, wherein the user device is connected to the target device via a remote desktop portal.

8. The computer program product of claim 6, wherein the multiple server scripts are stored on a desktop of the user device and the one or more server scripts are executed on the target device using a command line interface.

9. The computer program product of claim 6, wherein the system is configured to transmit an option to the user device to generate an additional database discovery report for the target device without performing a database downgrade by using an ancillary downgrade tool.

10. The computer program product of claim 6, wherein each of the multiple server scripts are executed one-by-one in a specific chronological order.

11. A computer implemented method for automating a software version downgrade of a database management system, the computer implemented method comprising:

receiving a request from a user via a user device to launch a downgrade tool;

transmitting a request for authentication information from the user;

performing a pre-validation check prior to performing a backup of a target device database comprising:

verifying a password for the user and determine if the user is authorized to perform the downgrade on the target device;

verifying drive mappings on the target device to determine a valid storage configuration on the target device; and performing a test of a remote connection between the user device and the target device;

receiving the authentication information from the user via the user device and authenticate the user to access the downgrade tool on the user device;

generating a connection between the user device and a target device, wherein the target device hosts a database to be downgraded;

generating the backup of the target device database and transmitting the backup to the user device;

receiving information for the target device and the database and automatically detecting a database version and a server version;

based on the database version and server version detected, generating multiple server scripts for downgrade of the target device database;

executing the generated server scripts to downgrade the target device database;

executing a post-task operation, wherein the post-take operation comprises performing a restore operation and re-applying original settings of relational database components from a relational database server to update database operating system server registry settings; and generating a database discovery report, wherein the database discovery report comprises a complete edition and version of all relational database server components and services installed on the target device.

12. The computer implemented method of claim 11, wherein the user device is connected to the target device via a remote desktop portal.

13. The computer implemented method of claim 11, wherein the multiple server scripts are stored on a desktop of the user device and the one or more server scripts are executed on the target device using a command line interface.

14. The computer implemented method of claim 11, wherein the system is configured to transmit an option to the user device to generate an additional database discovery report for the target device without performing a database downgrade by using an ancillary downgrade tool.

* * * * *